United States Patent [19]

Pastor et al.

[11] Patent Number: 4,617,336

[45] Date of Patent: Oct. 14, 1986

[54] ACYLATED CALIXARENE STABILIZERS

[75] Inventors: Stephen D. Pastor, Yonkers, N.Y.; Paul Odorisio, Palisades Park, N.J.

[73] Assignee: Ciba-Geigy Corporation, Ardsley, N.Y.

[21] Appl. No.: 800,842

[22] Filed: Nov. 22, 1985

[51] Int. Cl.[4] .................. C07C 69/76; C08K 5/10
[52] U.S. Cl. .................................. 524/291; 560/75
[58] Field of Search .......................... 560/75; 524/291

[56] References Cited

U.S. PATENT DOCUMENTS

| | | | |
|---|---|---|---|
| 3,364,250 | 1/1968 | Dexter et al. | 560/75 |
| 4,259,464 | 3/1981 | Buriks et al. | 525/480 |
| 4,434,265 | 2/1984 | Chasar | 568/720 |

OTHER PUBLICATIONS

Patrick et al—J. Org. Chem. 42, No. 2, pp. 382–383, 1977.

Gutsche—Accounts of Chemical Research, vol. 16, No. 5, May 1983, pp. 161–170.

*Primary Examiner*—Veronica P. Hoke
*Attorney, Agent, or Firm*—Harry Falber

[57] ABSTRACT

Acylated calixarene derivatives of the formula

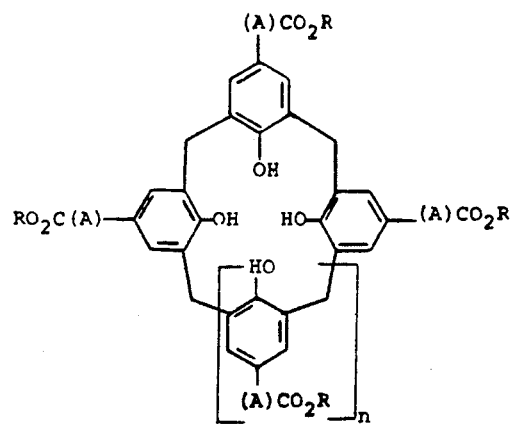

are prepared by the reaction of the appropriate hydroxyphenyl alkanoate and paraformaldehyde and are useful stabilizers of organic materials.

15 Claims, No Drawings

ACYLATED CALIXARENE STABILIZERS

Organic polyermic materials such as plastics and resins, are subject to thermal, oxidative and photo-degradation. A great variety of stabilizers are known in the art for stabilizing a diversity of substrates. Their effectiveness varies depending upon the causes of degradation and the substrate stabilized. In general, it is difficult to predict which stabilizer will be most effective and most economical for any one area of application. For example, stabilizer effectiveness in reducing volatility may depend upon preventing bond scission in the substrate molecule. Limiting embrittlement and retaining elasticity in a polymer or rubber may require prevention of excessive crosslinking and/or chain scission. Prevention of discoloration may require inhibiting reaction which yield new chromophores or color bodies in the substrate or stabilizer. Problems of process stability and incompatibility must also be considered.

It has now been determined that the acylated calixarene derivatives of this invention exhibit a variety of desirable properties which makes them particularly effective and useful as stabilizers. These advantages can be summarized as follows:

(1) They are lower melting materials allowing for easier processing and blending with polymeric substrates.

(2) They are soluble in hydrocarbon solvents which correlates with higher compatibility with polymeric substrates.

(3) They exhibit greater combined antioxidant and light stabilizing ability in polymeric substrates which are subject to autooxidation.

(4) They exhibit low volatility which has the advantage of low loss from polymeric substrates during thermal processing.

(5) They have the ability to chelate metals. This property has advantage in applications where high concentrations of metal ions are known to catalyze autooxidation (e.g., insulation for copper cable and engine lubricating oils).

(6) They show excellent activity in protecting polyolefins, high impact polystyrene, rubbers such as polybutadiene and styrene-butadiene rubber, and other elastomers wherein retention of elasticity and inhibition of crosslinking, crazing, discoloration, odor formation and exudation are basic requirements.

Various calixarene compounds and processes for their preparation have been disclosed in the prior art. For example, a general review of phenol-formaldehyde condensations and the resulting condensation products are disclosed in Houben-Weyl 6, 1036. It has also been established that, under specific conditions, the reaction of para-substituted phenols with formaldehyde preferentially yields cyclic oligomeric condensation products. Thus, Patrick et al., J. Org. Chem. 42, No. 2, 382–3 (1977) disclose the preparation of methyl, tert.butyl, phenyl, methoxy and carbomethoxy-substituted phenolic [1.1.1] metacyclophanes. Gutsche, Acc. Chem. Res. 16, 161–170 (1983) disputes the Patrick et al. experimentation and then discloses various methyl, tert.butyl, tert.amyl, octyl and phenyl-substituted calixarenes. U.S. Pat. No. 4,259,464 additionally discloses such compounds. Alkyl, cyclohexyl, phenyl and benzyl-substituted calixarenes are noted. U.S. Pat. No. 4,434,265 discloses compounds which are calixarene in nature, although being decidedly different, and suggests that the cyclic compounds function as antioxidants in rubbers and polyolefins. Since most of these products are characteristically insoluble and high melting, the benefits of the instant compounds noted hereinabove are not generally available.

It is the primary object of this invention to provide a class of acylated calixarene derivatives which exhibits a broad range of improved stabilization performance characteristics.

Various other objects and advantages of this invention will become evident from the following description thereof.

The compounds of this invention correspond to the formula

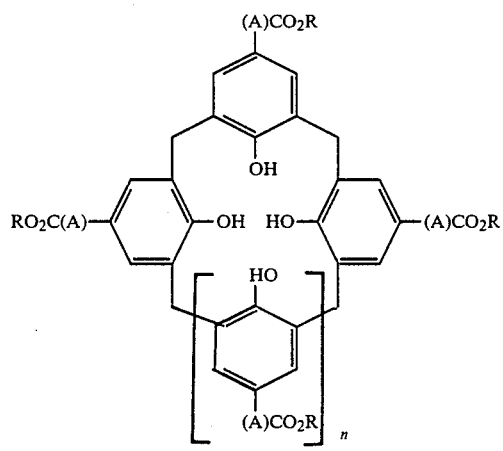

wherein

A is a direct bond or is alkylene of 1 to 2 carbon atoms;

R, when A is a direct bond, is alkyl of 4 to 30 carbon atoms, cycloalkyl of 5 to 6 carbon atoms, phenyl or phenyl substituted by alkyl of 1 to 18 carbon atoms;

R, when A is alkylene, is alkyl of 1 to 30 carbon atoms, cycloalkyl of 5 to 6 carbon atoms, phenyl or phenyl substituted by alkyl of 1 to 18 carbon atoms; and n is 1–7.

A is preferably a direct bond or ethylene. R is preferably straight-chain or branched alkyl of 4 to 18 carbon atoms such as n-butyl, sec-butyl, tert.butyl, 2-ethylhexyl, n-octyl, dodecyl and octadecyl; phenyl or cyclohexyl.

The cyclic derivatives of this invention can be prepared by reacting the appropriately substituted hydroxyphenyl alkanoate with paraformaldehyde in an appropriate solvent to yield the desired product. The solvent is a high boiling aromatic hydrocarbon such as xylene, decalin and the like. Xylene is preferred. The reaction temperature ranges from 110° to 200° C. The reaction is preferably conducted at the reflux temperatures of the solvent and the water of reaction is removed as an azeotrope. The preferred method for preparing the compounds of this invention involves reacting the alkanoate with the paraformaldehyde in the presence of an alkali hydroxide (e.g. NaOH, KOH) as a proton acceptor. The starting materials needed to prepare the stabilizers of this invention are items of commerce or can be prepared by known methods.

The compounds of the present invention are particularly effective in stabilizing organic materials subject to oxidative, thermal and actinic degradation, such as plastics, polymers and resins.

Substrates in which the compounds of the formulae I and II are particularly useful are polyolefins such as polyethylene and polypropylene; polystyrene including impact polystyrene, ABS resin, SBR, isoprene, as well as natural rubber, polyesters including polyethylene terephthalate and polybutylene terephthalate, including copolymers, and lubricating oils such as those derived from mineral oil.

In general polymers which can be stabilized include:

1. Polymers of monoolefins and diolefins, for example polyethylene (which optionally can be crosslinked), polypropylene, polyisobutylene, polybutene-1, polymethylpentene-1, polyisoprene or polybutadiene, as well as polymers of cycloolefins, for instance of cyclopentene or norbornene.

2. Mixtures of the polymers mentioned under (1), for example mixtures of polypropylene with polyisobutylene.

3. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidene-norbornene.

4. Polystyrene, poly-(p-methylstyrene).

5. Copolymers of styrene or α-methylstyrene with dienes or acrylic derivatives, such as, for example, styrene/butadiene, styrene/acrylonitrile, styrene/ethyl methacrylate, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.

6. Graft copolymers of styrene, such as, for example, styrene on polybutadiene, styrene and acrylonitrile on polybutadiene, styrene and alkyl acrylates or methacrylates on polybutadiene, styrene and acrylonitrile on ethylene/propylene terpolymers, styrene and acrylonitrile on polyacrylates or polymethacrylates, styrene and acrylonitrile on acrylate/butadiene copolymers, as well as mixtures thereof with the copolymers listed under (5), for instance the copolymer mixtures known as ABS-, MBS-, ASA- or AES-polymers.

7. Halogen-containing polymers, such as polychloroprene, chlorinated rubbers, chlorinated or sulfochlorinated polyethylene, epichlorohydrine homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate or vinylidene chloride/vinyl acetate copolymers.

8. Polymers which are derived from $\alpha,\beta$-unsaturated acids and derivatives thereof, such as polyacrylates and polymethacrylates, polyacrylamide and polyacrylonitrile.

9. Copolymers from the monomers mentioned under (8) with each other or with other unsaturated monomers, such as, for instance, acrylonitrile/butadien, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinylbutyral, polyallyl phthalate or polyallyl-melamine.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and those polyoxymethylenes which contain ethylene oxide as comonomer.

13. Polyphenylene oxides and sulfides, and mixtures of polyphenylene oxides with polystyrene.

14. Polyurethanes which are derived from polyethers, polyesters or polybutadiens with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polaymide 12, poly-2,4,4-trimethylhexamethylene terephthalamid or poly-m-phenylene isophthalamide, as well as copolymers thereof with polyethers, such as for instance with polyethylene glycol, polypropylene glycol or polytetramethylene glycols.

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane]terephthalate and polyhydroxybenzoates as well as block-copolyether-esters derived from polyethers having hydroxyl end groups.

18. Polycarbonates.

19. Polysulfones, polyethersulfones and polyetherketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low inflammability.

23. Thermosetting acrylic resins, derived from substituted acrylic esters, such as epoxy-acrylates, urethane-acrylates or polyester acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.

26. Natural polymers, such as cellulose, rubber, gelatine and derivatives thereof which are chemically modified in a polymerhomologous manner, such as cellulose acetates, cellulose propionates and cellulose butyrates, or the cellulose ethers, such as methylcellulose.

27. Mixtures of polymers as mentioned above, for example PP/EPDM, Polyamide 6/EPDM or ABS, PVC/EVA, PVC/ABS, PVC/MBS, PC/ABS, PBTP/ABS.

28 Naturally occuring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellithates) and also mixtures of synthetic esters with mineral oils in any weight ratios, which materials may be used as plasticizer for polymers or as textile spinning oils, as well as aqueous emulsions of such materials.

29. Aqueous emulsions of natural or synthetic rubber, e.g. natural latex or latices or carboxylated styrene/butadiene copolymers.

In general, the compounds of the formulae I and II of the present invention are employed in from about 0.01 to about 5% by weight of the stabilized composition, although this will vary with the particular substrate and application. An advantageous range is from about 0.5 to about 2%, and especially 0.1 to about 1%.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain various conventional additives, such as the following.

1. Antioxidants 1.1. Alkylated monophenols, for example,
2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert.butyl-4-methoxymethylphenol 1.2. Alkylated hydroquinones, for example,
2,6-di-tert.butyl-4-methoxyphenol
2,5-di-tert.butyl-hydroquinone
2,5-di-tert.amyl-hydroquinone
2,6-diphenyl-4-octadecyloxyphenol 1.3. Hydroxylated thiodiphenyl ethers, for example
2,2'-thio-bis-(6-tert.butyl-4-methylphenol)
2,2'-thio-bis-(4-octylphenol)
4,4'-thio-bis-(6-tert.butyl-3-methylphenol)
4,4'-thio-bis-(6-tert.butyl-2-methylphenol)

1.4. Alkyliden-bisphenols, for example,
2,2'-methylene-bis-(6-tert.butyl-4-methylphenol)
2,2'-methylene-bis-(6-tert.butyl-4-ethylphenol)
2,2'-methylene-bis[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
4,4'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl)-butane
2,6-di-(3-tert.butyl-5-methyl-2-hydroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane
ethylenglycol-bis-[3,3-bis-(3'-tert.butyl-4'-hydroxyphenyl)-butyrat]
di-(3-tert.butyl-4-hydroxy-5-methylphenyl)-dicyclopentadien
di-[2-(3'-tert.butyl-2'-hydroxy-5'-methyl-benzyl)-6-tert.butyl-4-methylphenyl]-terephthalate.

1.5. Benzyl compounds, for example,
1,3,5-tri-(3,5-di-tert.butyl-4-hydroxybenzyl)-2,4,6-trimethylbenzene-di-(3,5-di-tert.butyl-4-hydroxybenzyl)sulfide
3,5-di-tert.butyl-4-hydroxybenzyl-mercapto-acetic acid isooctyl ester
bis-(4-tert.butyl-3-hydroxy-2,6-dimethylbenzyl)dithiolterephthalate
1,3,5-tris-(3,5-di-tert.butyl-4-hydroxybenzyl)-isocyanurate
1,3,5-tris-(4-tert.butyl-3-hydroxy-2,6-dimethylbenzyl)isocyanurate
3,5-di-tert.butyl-4-hydroxybenzyl-phosphoric acid di-octadecyl ester
3,5-di-tert.butyl-4-hydroxybenzyl-phosphoric acid monoethyl ester, calcium-salt 1.6. Acylaminophenols, for example,
4-hydroxy-lauric acid anilide
4-hydroxy-stearic acid anilide
2,4-bis-octylmercapto-6-(3,5-tert.butyl-4-hydroxyanilino)-s-triazine
octyl-N-(3,5-di-tert.butyl-4-hydroxyphenyl)-carbaminate 1.7. Esters of β-(3,5-di-tert.butyl-4-hydroxyphenyl)-propionic acid with monohydric or polyhydric alcohols, for example,
methanol
octadecanol
1,6-hexanediol
neopentylglycol
thiodiethyleneglycol
diethyleneglycol
triethyleneglycol
pentaerythritol
tris-hydroxyethyl isocyanurate
di-hydroxyethyl oxalic acid diamide 1.8. Ester of β-(5-tert.butyl-4-hydroxy-3-methylphenyl)-propionic acid with monohydric or polyhydric alcohols, for example,
methanol
octadecanol
1,6-hexanediol neopentylglycol
thiodiethyleneglycol
diethyleneglycol
triethyleneglycol
pentaerytritol
tris-hydroxyethyl isocyanurate
di-hydroxyethyl oxalic acid diamide 1.9. Amides of β-(3,5-di-tert.butyl-4-hydroxyphenyl)-propionic acid for example,
N,N'-di-(3,5-di-tert.butyl-4-hydroxyphenylpropionyl)-hexamethylendiamine
N,N'-di-(3,5-di-tert.butyl-4-hydroxyphenylpropionyl)-trimethylendiamine
N,N'-di-(3,5-di-tert.butyl-4-hydroxyphenylpropionyl)-hydrazine

2. UV absorbers and light stabilisers 2.1. 2-(2'-Hydroxyphenyl)-benztriazoles, for example, the 5'-methyl-, 3',5'-di-tert.butyl-, 5'-tert.butyl-, 5'-(1,1,3,3-tetramethylbutyl)-, 5-chloro-3',5'-di-tert.-butyl-, 5-chloro-3'-tert.butyl-5'-methyl-, 3'-sec.butyl-5'-tert.butyl-, 4'-octoxy, 3',5'-di-tert.amyl-, 3',5'-bis-(α,α-dimethylbenzyl)-derivative.

2.2. 2-Hydroxy-benzophenones, for example, the 4-hydroxy-, 4-methoxy-, 4-octoxy-, 4-decyloxy-, 4-dodecyloxy-, 4-benzyloxy, 4,2',4'-trihydroxy- and 2'-hydroxy-4,4'-dimethoxy derivative.

2.3. Ester of optionally substituted benzoic acids for example, phenyl salicylate, 4-tert.butyl-phenylsalicilate, octylphenyl salicylate, dibenzoylresorcinol, bis-(4-tert.-butylbenzoyl)-resorcinol, benzoylresorcinol, 3,5-di-tert.-butyl-4-hydroxybenzoic acid 2,4-di-tert.butyl-phenyl ester and 3,5-di-tert.-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5 Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-di-ethanolamine, nickel dibutyldithiocarbamate, nickel salts of 4-hydroxy-3,5-di-tert.-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazol, optionally with additional ligands.

2.6. Sterically hindered amines, for example bis-(2,2,6,6-tetramethylpiperidyl)-sebacate bis-(1,2,2,6,6-pentamethylpiperidyl)-sebacate n-butyl-3,5-di-tert.butyl-4-hydroxybenzyl malonic acid bis-(1,2,2,6,6-pentamethylpiperidyl)ester, condensation product of 1-hdyroxyethyl-2,2,6,6-tetramethyl-4-hydroxypiperidine and succinic acid, condensation product of N,N'-(2,2,6,6-tetramethylpiperidyl)-hexamethylendiamine and 4-tert.octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butanetetracarbonic acid, 1,1'(1,2-ethanediyl)-bis-(3,3,5,5-tetramethyl-piperazinone).

2.7. Oxalic acid diamides, for example, 4,4'-dioctyloxyoxanilide, 2,2'-di-octyloxy-5,5'-di-tert.butyl-oxanilide, 2,2'-di-dodecyloxy-5,5'-di-tert.butyl-oxanilide, 2-ethyoxy-2'-ethyl-oxanilide, N,N'-bis (3-dimethylaminopropyl)oxalamide, 2-ethoxy-5-tert.butyl-2'-ethyloxanilide and its mixture with 2-ethoxy-2'-ethyl-5,4'-di-tert.butyloxanilide and mixtures of ortho- and para-methoxy- as well as of o- and p-ethoxy-disubstituted oxanilides.

3. Metal deactivators

For example, N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino-1,2,4-triazole, bis-benzyliden-oxalic acid dihydrazide.

4. Phosphites and phosphonites

For example, triphenyl phosphite, diphenylalkyl phosphites, phenyldialkyl phosphites, tri-(nonylphenyl)phosphite, trilauryl phosphite, trioctadecyl phosphite, di-stearyl-pentaerythrit diphosphite, tris-(2,4-di-tert.butylphenyl)phosphite, di-isodecylpentaerythritoldiphosphite, di-(2,4-di-tert.-butylphenyl)pentaerythritol diphosphite, tristearyl-sorbite triphosphite, tetrakis-(2,4-di-tert.butylphenyl)-4,4'-diphenylylendiphosphonite.

5. Compounds which destroy peroxide

For example, esters of β-thiodipropionic acid, for example the lauryl, stearyl, myristyl or tridecyl esters, mercapto-benzimidazole or the zinc salt of 2-mercaptobenzimidazole, zinc-dibutyl-dithiocarbamate, dioctadecyldisulfide, pentaerythritoltetrakis-(β-dodecylmercapto)-propionate.

6. Polyamide stabilisers

For example copper salts in combination with iodides and/or phosphorus compounds and salts of divalent manganese.

7. Basic co-stabilisers

For example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Nucleating agents

For example, 4-tert.butyl-benzoic acid, adipic acid, diphenylacetic acid.

9. Fillers and reinforcing agents

For example, calcium carbonate, silicates, glass fibres, asbestos, talc, kaolin, mica, barium sulfate, metal oxides and hydroxides, carbon black, graphite.

10. Other additives

For example, plasticizers, lubricants, emulsifiers, pigments, optical brighteners, flameproofing agents, antistatic agents, blowing agents and thisoynergists such as dilaurylthiodipropionate or distearylthiodipropionate.

The following examples illustrate the embodiment of this invention. In these examples, all parts given are by weight unless otherwise specified. EXAMPLE 1

Para-[2-(carbomethyoxy)ethyl]hydroxycalix(n)arene

A 500 ml flask equipped with a nitrogen sweep, a mechanical stirrer and a Dean-Stark trap is charged with a mixture of 66.7 g (0.37 mol) of methyl 3-(4-hydroxyphenyl)propanoate, 21.0 g (0.70 mol) of paraformaldehyde and 0.8 ml of a 10M aqueous potassium hydroxide solution in 300 ml of xylene. The mixture is heated at reflux until 7.5 ml (100% of theory) of water has collected in the trap. The cooled reaction mixture is diluted with 100 ml of dichloromethane and 50 ml of a 1N aqueous hydrochloric acid solution and the layers are separated. The organic layer is washed with water and dried over sodium sulfate. After evaporation of the solvent, the crude residue is crystallized from acetonitrile to give 5.60 g (7.9% of a colorless solid, m.p. 330°–340° C.

Anal. Calcd. for $C_{11}H_{12}O_3$; C, 68.7; H, 6.3. Found: C, 68.6; H, 6.2.

EXAMPLE 2

The mother liquor of Example 1 is concentrated in vacuo and the residue is purified by chromatography (silica gel; acetonitrile: toluene eluent) to give 6.0 g (8.4% yield) of a colorless solid. The purified solid is recrystallized from 60 ml of isopropanol to give 3.0 g (4.2% yield) of a colorless solid m.p. 195°–216° C.

Anal. Calcd. for $C_{11}H_{12}O_3$; C, 68.7; H, 6.3. Found: C, 68.4; H, 6.5

EXAMPLE 3

Para-[2-(carbododecyloxy)ethyl]hydroxycalix[n]arene

The procedure of Example 1 is followed using 29.0 g (0.087 mol) of dodecyl 3-(4-hydroxyphenyl)propanoate, 4.93 g (0.164 mol) of paraformaldehyde, 0.2 ml of a 10M aqueous potassium hydroxide solution and 200 ml of xylene. The residue is purified by chromatography (silica gel; dichloromethane: ethyl acetate eluent) to give 8.4 g (26% yield) of a colorless solid, m.p. 30°–40° C.

Anal. Calcd. for $C_{22}H_{34}O_2$: C, 76.3; H, 9.9. Found: C, 76.6; H, 10.1.

EXAMPLE 4

Para-[2(carbooctadecyloxy)ethyl]hydroxycalix[n]arene

The procedure of Example 1 is followed using 31.0 g (0.074 mol) of octadecyl 3-(4-hydroxyphenyl)propanoate, 4.20 g (0.139 mol) of paraformaldehyde, 0.2 ml of a 10M aqueous potassium hydroxide solution and 200 ml of xylene. The residue is purified by recrystallization from acetone to give 22.6 g (71% yield) of a colorless solid, m.p. 60°–80° C.

Anal. Calcd. for $C_{28}H_{46}O_3$; C, 78.1; H, 10.8. Found: C, 77.5; H, 10.8.

EXAMPLE 5

Para-carbododecyloxyhydroxy-calix(n)arene

A 500 ml flask equipped with a nitrogen sweep, a mechanical stirrer and a Dean-Stark trap is charged with a mixture of 40.0 g (0.13 mol) of dodecyl 4-hydroxybenzoate, 6.35 g (0.21 mol) of paraformaldehyde and 0.3 ml of a 10M aqueous potassium hydroxide solution in 200 ml of xylene. The mixture is heated at reflux until 2.3 ml (100% of theory) of water are collected in the trap. The cooled reaction mixture is diluted with 50 ml of dichloromethane and 25 ml of aqueous hydrochloric acid solution and the layers are separated. The organic layers are separated. The organic layer is washed with water and dried over sodium sulfate. After evaporation of the solvent, the crude residue is treated with 700 ml of hot heptane and allowed to cool. The colorless solid is collected by filtration and is recrystallized from 200 ml of acetonitrile to give 13.5 g (33% yield) of a colorless solid, m.p. 230°–265° C.

Anal. Calcd. for $C_{20}H_{30}O_3$; C, 75.4; H, 9.5 Found: C, 75.0; H, 9.4.

EXAMPLE 6

The mother liquor of the heptane treatment in Example 5 is concentrated in vacuo and the residue is crystallized from 200 ml of acetonitrile to give 5.0 g (12% yield) of a colorless solid, m.p. 160°–175°C.

Anal. Calcd. for $C_{20}H_{30}O_3$; C, 75.4; H, 9.5 Found: C, 75.3; H, 9.6.

EXAMPLE 7

Para-carbooctadecyloxy-hydroxycalix(n)arene

The procedure for Example 5 is followed using 39.1 g (0.1 mol) of octadecyl 4-hydroxybenzoate, 4.9 g (0.16 mol) of paraformaldehyde, 0.3 ml of a 10M aqueous potassium hydroxide solution and 200 ml of xylene. The residue is recrystallized from 500 ml of acetone to give 16.1 g (40% yield) of a colorless solid, m.p. 220°–240° C.

Anal. Calcd. for $C_{26}H_{42}O_3$: C, 77.6; H, 10.5 Found: C, 77.3; H, 10.6

EXAMPLE 8

Para-carbobutoxy-hydroxycalix(n)arene

The procedure for Example 5 is followed using 48.6 g (0.25 mol) of butyl 4-hydroxybenzoate, 12.2 g (0.41 mol) of paraformaldehyde, 0.5 ml of a 10M aqueous potassium hydroxide solution and 200 ml of xylene. The residue is treated with hot methanol and cooled. The off white solid is collected by filtration and is crystallized from 60 ml of acetone to give 13.7 g (27% yield) of a colorless solid, m.p. 239°–242° C.

Anal. Calcd. for $C_{12}H_{14}O_3$: C, 69.8; H, 6.8 Found: C, 69.5; H, 7.1

EXAMPLE 9

Unstabilized polypropylene powder (Hercules Profax 6501) is thoroughly blended with the indicated amount of additive. The blended materials are then milled on a two roll mill at 182° C. for 5 minutes, after which time the stabilized polypropylene is sheeted from the mill and allowed to cool. The milled polypropylene is then cut into pieces and compression molded on a hydraulic press at 220° C. and 175 psi ($1.2 \times 10^6$ Pa) into 25 mil thick plaques. The plaques are then exposed to air in a force draft oven maintained at 150° C. The plaques are considered to have failed on showing the first signs of decomposition (e.g. cracking or brown edges).

| Additive Compound of | Additive Conc. (%) | Oxidative Stability Time to Failure (Hours) |
| --- | --- | --- |
| Base Resin | none | <20 |
| Base Resin with 0.3% DLTDP | none | <20 |
| Example 3 | 0.2 | 150 |
| Example 3 with 0.3% DLTDP | 0.1 | 420 |
| Example 4 | 0.3 | 150 |
| Example 4 with 0.3% DLTDP | 0.1 | 340 |
| Base Resin with 0.3% DSTDP | none | <20 |
| Example 5 | 0.2 | 30 |
| Example 5 with 0.3% DSTDP | 0.1 | 210 |

-continued

| Additive Compound of | Additive Conc. (%) | Oxidative Stability Time to Failure (Hours) |
|---|---|---|
| Example 7 | 0.2 | 30 |
| Example 7 with 0.3% DSTDP | 0.1 | 250 |
| Example 8 | 0.2 | 20 |
| Example 8 with 0.3% DSTDP | 0.1 | 210 |

DLTDP — dilaurylthiodipropionate
DSTDP — distearylthiodipropionate

EXAMPLE 10

Unstabilized polypropylene powder (Hercules Profax 6501) is thoroughly blended with the indicated amount of additive. The blended materials are then milled on a two roll mill at 182° C. for five minutes, after which time the stabilized polypropylene is sheeted from the mill and allowed to cool. The milled polypropylene is then cut into pieces and compression molded on a hydraulic press at 220° C. and 175 psi ($1.2 \times 10^6$ Pa) into 5 mil (0.127 mm) films. The samples are exposed in a fluorescent sunlight/black light chamber until failure. Failure is taken as the hours required to reach 0.5 carbonyl absorbance by infrared spectroscopy on the exposed films.

| Additive Compound of | Additive Conc. (% by weight) | FS/BL Test Results (Hours to Failure) |
|---|---|---|
| None | — | 130 |
| Example 3 | 0.2 | 230 |
| Example 4 | 0.3 | 240 |

EXAMPLE 11

The oxidation stability of milled polypropylene samples (prepared as in Examples 9 and 10), containing the indicated stabilizers, is measured on stretched tapes of 2 mil thickness on exposure to air in a forced draft oven at 115° C. The tapes are considered to have failed on showing the first signs of decomposition (e.g., embrittlement).

| Additive Compound of | Additive Conc. (%) | Oxidative Stability Time to Failure (Hrs) |
|---|---|---|
| Base Resin | none | 96–165 |
| Example 7 | 0.2 | 290 |

EXAMPLE 12

This example illustrates the stabilization of acrylonitrile-butadiene-styrene (ABS) copolymer by the compounds of this invention. The testing procedure is as follows:

The antioxidant is dissolved in toluene and emulsified in water using Triton X-100 (Rohm & Haas) as a surfactant. The resultant emulsion is mixed well with ABS copolymer containing 40% butadiene (rubber). Steam coagulation of the emulsion/latex mixture yields 40% rubber stabilized ABS crumbs which are then dried at 80° C. for 30 minutes in a fluidized bed drier. The resultant crumbs are combined with styrene-acrylonitrile pellets on a two roll mill for six minutes. The resultant 15% rubber containing ABS milled sheet is compression molded at 400° F. into 60 mil plaques which are die cut into 1"×3" specimens. The sample plaques are then oven aged at 150° C. and the angle to break is monitored (ASTM D747). This consists of applying a set load through an angle with one stationary point and one moveable point, flexing the sample. The angle is monitored for several aging periods until the specimen breaks.

| Additive (0.225%) | Angle to Break (Oven Aged Samples) | | | | |
|---|---|---|---|---|---|
| | 0 | 30 Min | 45 Min | 60 Min | 120 Min |
| Base | NB | NB | 50 | — | — |
| Example 4 | NB | NB | NB | NB | 55 |

NB = No break

EXAMPLE 13

This example provides solubility data for the instant stabilizers in two hydrocarbon solvents. The indicated stabilizer is dissolved in the minimal amount of solvent at 24° to 25° C. The value range reported is percent by weight of additive in total weight of solution.

| Additive Cpd. of | wt/wt % Solubility in Toluene | wt/wt % Solubility in Heptane |
|---|---|---|
| Example 3 | >50 | >25 <50 |
| Example 4 | >20 <25 | >10 <20 |
| Example 5 | >10 <20 | — |
| Example 6 | >10 <20 | — |
| Example 7 | >20 <25 | — |

The data in Examples 9–13 thus indicate the effective stabilization activity of the instant compounds.

Summarizing, it is seen that this invention provides novel compounds which exhibit effective stabilization activity. Variations my be made in proportions, procedures and materials without departing from the scope of the invention as defined by the following claims.

What is claimed is:

1. A compound of the formula

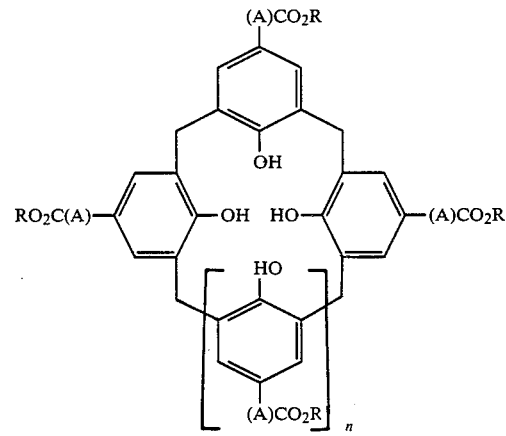

wherein
A is a direct bond or is alkylene of 1 to 2 carbon atoms;
R, when A is a direct bond, is alkyl of 4 to 30 carbon atoms, cycloalkyl of 5 to 6 carbon atoms, phenyl or phenyl substituted by alkyl of 1 to 18 carbon atoms;
R, when A is alkylene, is alkyl of 1 to 30 carbon atoms, cycloalkyl of 5 to 6 carbon atoms, phenyl or phenyl substituted by alkyl of 1 to 18 carbon atoms; and n is 1-7.

2. The compound of claim 1, wherein A is a direct bond.

3. The compound of claim 1, wherein A is ethylene.

4. The compound of claim 1, wherein R is alkyl of 4 to 18 carbon atoms.

5. Para-[2-(carbomethoxy)ethyl]hydroxycalix[n]arene according to claim 3.

6. Para-[2-(carbododecyloxy)ethyl]hydroxycalix[n]arene according to claim 3.

7. Para-[2(carbooctadecyloxy)ethyl]hydroxycalix[n]arene according to claim 3.

8. Para-carbododecyloxy-hydroxycalix(n)arene according to claim 2.

9. Para-carbooctadecyloxy-hydroxycalix(n)arene according to claim 2.

10. Para-carbobutoxy-hydroxycalix(n)arene according to claim 2.

11. A composition of matter comprising an organic material subject to oxidative, thermal and actinic degradation stabilized with an effective stabilizing amount of a compound of claim 1.

12. The composition of claim 11, wherein the organic material is a synthetic polymer.

13. The composition of claim 12, wherein said synthetic polymer is a polyolefin homopolymer or copolymer.

14. The composition of claim 13, wherein said synthetic polymer is a sytrene homopolymer, copolymer or terpolymer.

15. A method for stabilizing an organic material against oxidative, thermal and acitinic degradation which comprises incoporating into said organic material an effective stabilizing amount of a compound of claim 1.

* * * * *